USOO5984379A

United States Patent [19]
Michel et al.

[11] Patent Number: 5,984,379
[45] Date of Patent: Nov. 16, 1999

[54] TARPAULIN RETENTION SYSTEM

[75] Inventors: Bud Michel; Ron Michel, both of St. Gregor; Les Hill; Troy Lucyshyn, both of Humboldt, all of Canada

[73] Assignee: Michel's Industries Ltd., St. Gregor, Canada

[21] Appl. No.: 09/106,668

[22] Filed: Jun. 29, 1998

[30] Foreign Application Priority Data

Oct. 30, 1997 [CA] Canada ................................. 2219611

[51] Int. Cl.$^6$ .................................................. B60J 11/00
[52] U.S. Cl. ............................ 286/100.16; 296/100.15; 160/327
[58] Field of Search .............................. 296/98, 100.15, 296/100.16, 100.01; 160/327, 328, 368.1

[56] References Cited

U.S. PATENT DOCUMENTS

| 2,554,542 | 5/1951 | Rust et al. ............................. 160/328 |
| 2,625,995 | 1/1953 | Rust et al. ............................. 160/328 |
| 2,678,691 | 5/1954 | Rust et al. ............................. 160/328 |
| 2,741,304 | 4/1956 | Burns ..................................... 160/328 |
| 2,745,487 | 5/1956 | Jensen ................................... 160/328 |
| 2,751,001 | 6/1956 | Lang ...................................... 160/328 |
| 2,880,797 | 4/1959 | Alvarez et al. ........................ 160/328 |
| 2,882,963 | 4/1959 | Florman et al. ....................... 160/328 |
| 4,484,777 | 11/1984 | Michel . |
| 4,792,179 | 12/1988 | Stevens ................................. 160/327 |
| 5,009,540 | 4/1991 | Nolan .................................... 160/327 |
| 5,121,960 | 6/1992 | Wheatley ............................. 160/368.1 |
| 5,180,203 | 1/1993 | Goudy . |
| 5,487,585 | 1/1996 | Wheatley ............................. 160/368.1 |
| 5,540,475 | 7/1996 | Kersting et al. ................... 296/100.16 |
| 5,542,734 | 8/1996 | Burchett et al. . |

FOREIGN PATENT DOCUMENTS

| 204830 | 9/1954 | Australia ............................... 160/328 |
| 277792 | 2/1928 | Canada . |
| 468933 | 10/1950 | Canada ................................. 160/328 |
| 504121 | 7/1954 | Canada ................................. 160/328 |
| 506506 | 10/1954 | Canada ................................. 160/328 |
| 541636 | 5/1957 | Canada ................................. 160/328 |
| 576915 | 6/1959 | Canada ................................. 160/328 |
| 629557 | 10/1961 | Canada . |
| 1131273 | 9/1982 | Canada . |
| 1132168 | 9/1982 | Canada . |
| 1171117 | 7/1984 | Canada . |
| 2034907 | 1/1991 | Canada . |
| 2060728 | 8/1993 | Canada . |
| 2225 599 | 11/1974 | France .................................. 160/327 |

Primary Examiner—Joseph D. Pape
Assistant Examiner—Kiran Patel
Attorney, Agent, or Firm—Killworth, Gottman, Hagan & Schaeff, L.L.P.

[57] ABSTRACT

Apparatus for retaining a side edge of a tarpaulin along a side portion of an open-topped box such as a truck box, wherein the tarpaulin includes a rigid rod connected along its side edge. The apparatus includes a bracket for attachment to the side of the box. A clamp arm is pivotally mounted to the bracket for movement about a pivot axis between a closed clamping position for securing the rod and tarpaulin side edge in fixed relation to the clamp arm and side portion of the box and an open position for releasing the rod and tarpaulin side edge. A clamp arm latch is pivotally mounted so that it can be manually shifted between a latched position wherein the clamp arm is secured in the closed position and an unlatched position wherein the clamp arm is free to pivot to the open position.

10 Claims, 4 Drawing Sheets

TARPAULIN RETENTION SYSTEM

BACKGROUND OF THE INVENTION

This invention relates to a tarpaulin cover retention system for use with open-topped boxes such as truck and trailer boxes.

The prior art has provided a wide variety of tarpaulin cover systems for use on open-topped truck and trailer boxes and the like. Certain of these tarpaulin cover systems employ roller devices whereby the tarpaulin may be rolled up and stored when not in use and thereafter unrolled and stretched across the open top of the box and secured in place thereby to protect the contents of the box from the effects of weather and against loss due to air currents encountered during highway transportation.

While several of the previously known systems have enjoyed a measure of success, these systems present some difficulties particularly in the means which they employ for releasably securing a side edge of the tarpaulin along a upper side portion of the open-topped box. Many of these devices are cumbersome and difficult to use, i.e. they do not provide for rapid attachment and detachment of the tarpaulin side edge. Some of the prior art arrangements do not provide the necessary degree of security against unwanted release while others do not provide an adequate seal between the tarpaulin side edge and the top side portion of the box with the result being that there is excess air ingress into the space between the tarpaulin and the material being carried which can result in a loss of materials, particularly when light particulate materials are being transported.

SUMMARY OF THE INVENTION

It is an object of the present invention to alleviate the above-noted difficulties associated with prior art devices and to provide a tarpaulin retention arrangement which is quick and relatively easy to use, which is simple and relatively trouble-free in construction, and which at the same time is capable of providing for an improved seal against air ingress between the tarpaulin side edge and the side portion of the box.

In accordance with the invention in one aspect there is provided apparatus for retaining a side edge of a tarpaulin along a side portion of an open-topped box such as a truck box, wherein said tarpaulin includes a rigid rod connected along its side edge, said apparatus comprising: a bracket for attachment to the side of the box, a clamp arm pivotally mounted to said bracket for movement about a pivot axis between a closed clamping position for securing, in use, said rod and tarpaulin side edge in fixed relation to said clamp arm and side portion of the box and an open position for releasing said rod and tarpaulin side edge, and a clamp arm latch pivotally mounted so that it can be manually shifted between a latched position wherein said clamp arm is secured in the closed position and an unlatched position wherein said clamp arm is free to pivot to the open position.

A further aspect of the invention provides an apparatus wherein the clamp arm latch is pivotally connected to said clamp arm for motion about an axis spaced from the pivot axis of said clamp arm between the latched position wherein said latch is interposed between said bracket and said clamp arm to prevent pivoting of said clamp arm toward the open position and the unlatched position wherein said latch is displaced away from said bracket to permit the pivoting of said clamp arm to the open position.

A still further aspect of the invention provides an apparatus wherein said clamp arm has a recess therein shaped to receive said rigid rod and tarpaulin side edge and to secure the latter between said clamp arm and the side portion of the box.

A still further aspect of the invention provides an apparatus wherein said clamp arm and recess therein are arranged to press said rigid rod and tarpaulin side edge toward the side portion of the box to reduce air leakage therebetween when in use.

A further aspect of the invention provides an apparatus wherein both said clamp arm and bracket have recesses therein arranged to co-operate to receive a V-shaped-in-cross section rigid rod with the legs of the V-shaped rod being directed toward said side portion of the box when in use and to bring one of the legs of the V-shaped rod into close proximity to said side portion to assist in sealing the tarpaulin side edge to the side portion of the box.

In a further aspect of the invention, a plurality of the above described retaining devices are provided in spaced relation along a top side portion of a truck box or the like to secure the side edge of a tarpaulin along said top side portion of the box.

A preferred embodiment of the invention will now be described by way of example, reference being had to the appended drawings.

BRIEF DESCRIPTION OF VIEWS OF DRAWINGS

DETAILED DESCRIPTION OF THE PREFERRED EMBODIMENT

Figure 1:
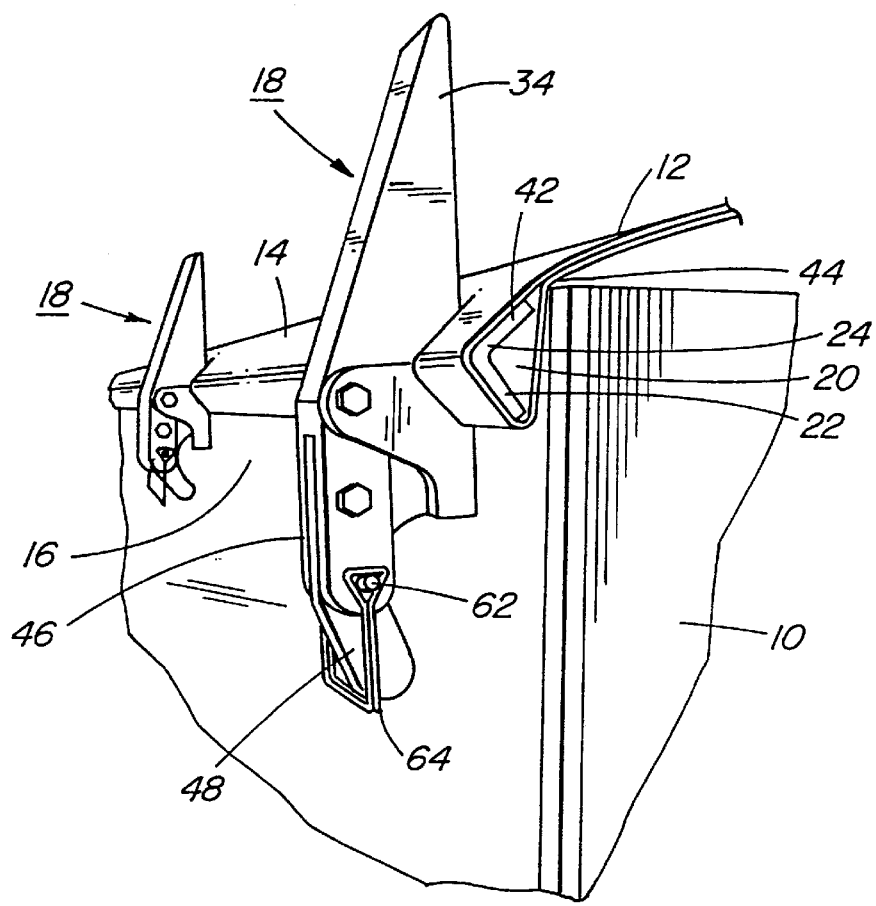
FIG. 1 is a perspective view looking generally along an upper side portion of a truck box and showing the tarpaulin side edge with the tarpaulin retention apparatus in the closed position.
Figure 2:
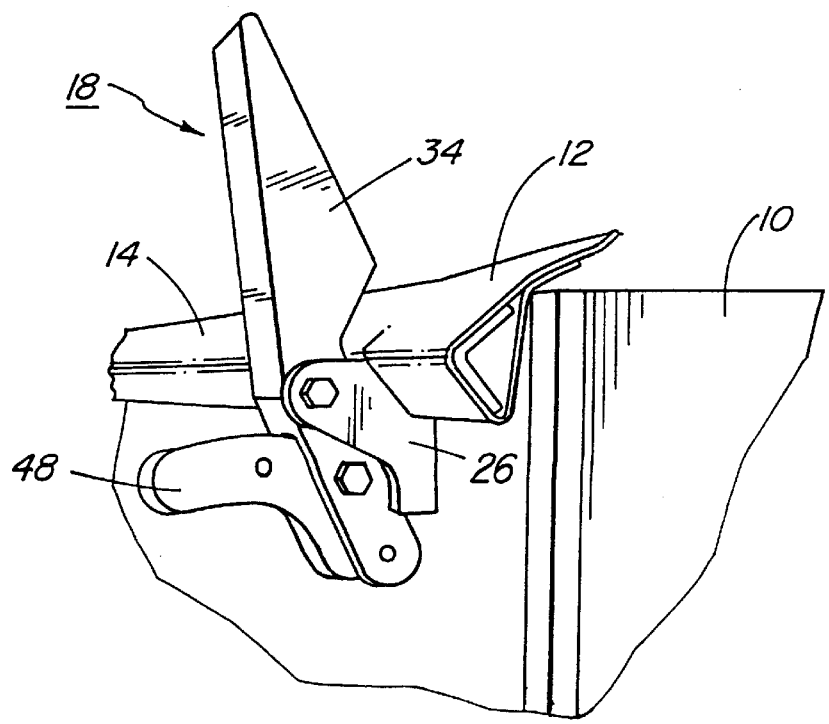
FIG. 2 is a view somewhat similar to FIG. 1 showing the retention apparatus in the open position such that the tarpaulin side edge is released therefrom.
Figure 3:
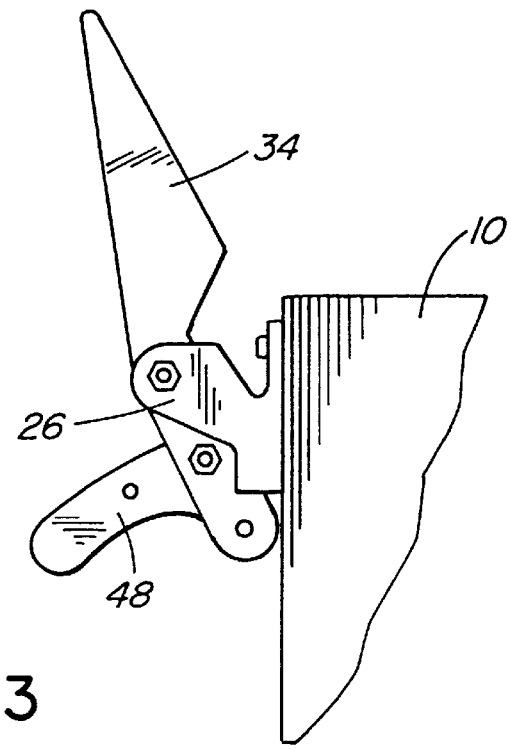
FIG. 3 is an end elevation view of the tarpaulin retention apparatus in the open position with the tarpaulin side edge removed therefrom.

Referring now to the drawings, particularly FIGS. 1–3, 5 and 6, there is shown an open-topped box 10 of conventional construction for use on a truck or trailer. A tarpaulin 12 extends across the open top of the box and the side edge 14 of this tarpaulin is secured along the upper side portion 16 of the box by means of a plurality of spaced apart tarpaulin side edge retainers 18 as illustrated. The retainers 18 are bolted to the upper side portion 16 of the truck box 10 in spaced apart relationship (e.g. 3–5 feet apart depending on the circumstances).

As clearly shown in the drawings, the tarpaulin side edge 14 is doubled back on itself and stitched together to create a longitudinal sleeve 20 into which is inserted a rigid rod 22 that is generally co-extensive with the tarpaulin. This rod is generally V-shaped in cross-section and when the tarpaulin edge is secured in position by means of the spaced apart retainers, the distal legs 24 of the V-shape are directed toward the upper side portion 16 of the box.

Figure 6:
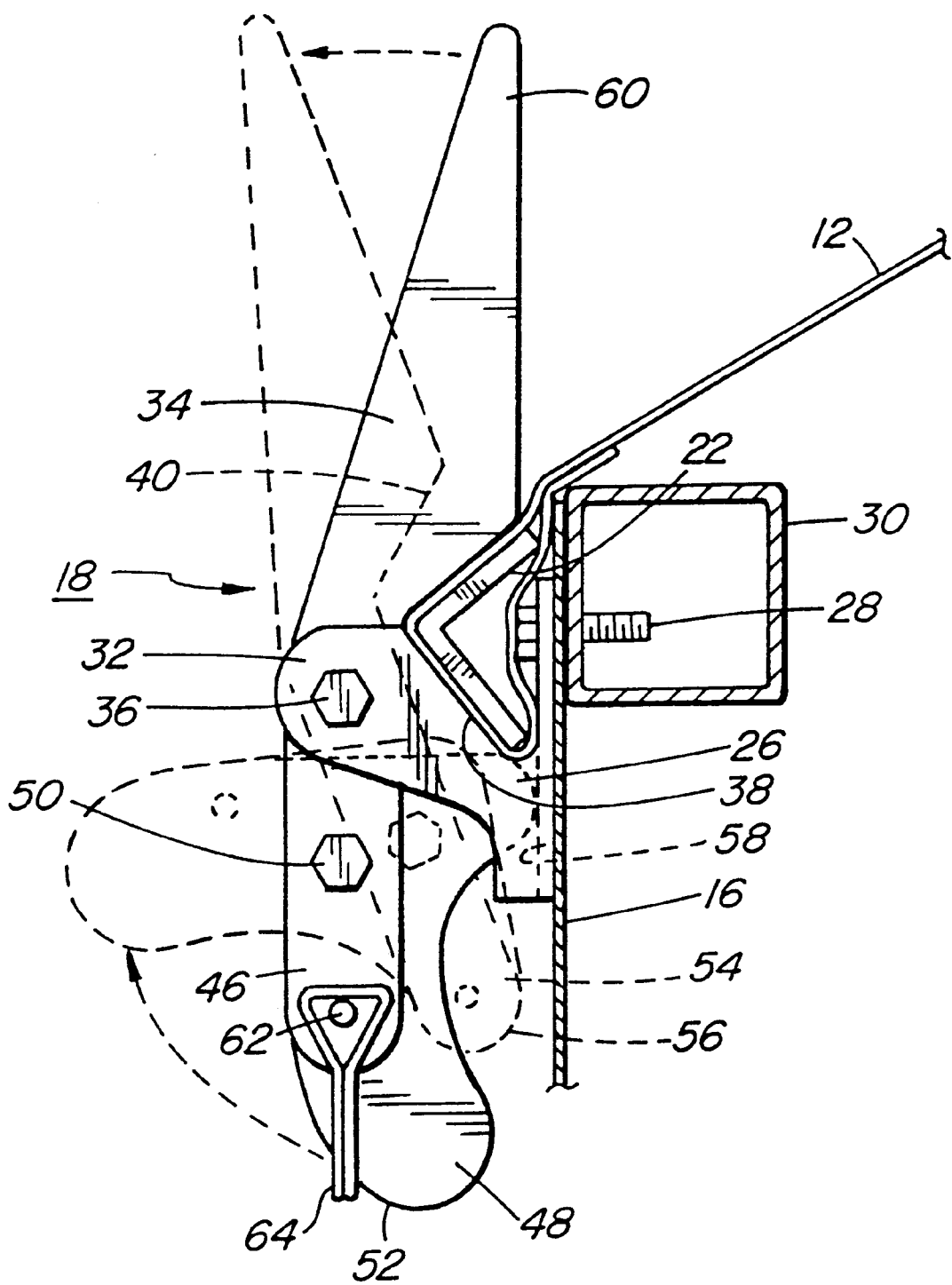
FIG. 6 is an end elevation view of the tarpaulin retention apparatus in the closed tarpaulin edge retaining position with the open tarpaulin edge releasing position being illustrated in phantom.

Each retainer 18 includes a mounting bracket 26 which is secured by a bolt 28 to the top rail 30 of the box 10 (see FIG. 6). The bracket includes a pair of outwardly projecting ears 32, between which is pivotally mounted the elongated clamp arm 34. A clamp arm bolt 36 extends through the distal end portions of the ears 32 and defines a pivot axis for the clamp arm 34.

Both of the ears 32 of the bracket 26 as well as the inner face of the clamp arm are notched 38, 40 so as to snugly receive and complement the V-shaped cross-section of the rigid rod 22 as best illustrated in FIG. 6. Hence, in the closed position of the clamp arm 34 (FIGS. 1 and 6), the V-shaped rod 22 and associated side edge 14 of the tarpaulin 12 are retained snugly in position with the upper distal leg 24 of the rod 22 pressing the fabric of the tarpaulin 12 against the upper side portion 16 of the box. This creates a sealing edge or lip 42 which co-operates with a further sealing edge 44 created along the upper outer corner of the box which the tarpaulin 12 contacts when in use, it being kept in mind that the tarpaulin 12 is drawn fairly tightly over the open top of the box 10 to prevent flapping of same during transportation. This "double seal" effect reduces air ingress into the space below the tarpaulin thus reducing losses of materials being transported particularly in the case of relatively light particulate materials.

Returning again to the structure of the clamp arm 34, it will be noted that such arm includes a downwardly depending bifurcated portion 46 positioned below the clamp arm bolt 36 and within which bifurcated portion there is pivotally mounted a clamp arm latch 48, the latch being pivotally mounted to the clamp arm 34 by means of a latch bolt 50 which extends through the bifurcated portion 46 of the clamp arm 34 in spaced apart relation to the aforementioned clamp arm bolt 36. The clamp arm latch 48 is arranged such that it can be manually pivoted between a latched position (shown in FIG. 1 and in full lines in FIG. 6), wherein the clamp arm 34 is secured in the closed tarpaulin side edge retaining position, and an unlatched position (shown in phantom in FIG. 6), wherein the clamp arm 34 is free to pivot to the open position thereby to release the side edge of the tarpaulin.

The clamp arm latch 48 is of a somewhat L-shaped configuration with the lower leg 52 of the L extending below the bifurcated portion of the clamp arm. The upper leg 54 of the latch 48 is smoothly convexly contoured at its distal end 56 and is arranged such that when the clamp arm 34 is manually pushed into the closed, tarpaulin edge retaining position, the latch can be pivoted counterclockwise, as seen in FIG. 6, such that the contoured distal end 56 of the upper leg swings around and comes into engagement with the inner wall 58 of the bracket 26 intermediate the previously noted bracket ears 32. With the latch 48 in the closed position, the clamp arm 34 is prevented from opening. It will readily be seen from an inspection of FIG. 6 that forces applied to the clamp arm 34 tending to pivot same in the counterclockwise direction serve to cause the upper leg 54 of the latch to firmly engage the bracket inner wall 58 with the line of action of this force passing in a direction laterally outwardly of the bracket a short distance above the latch bolt 50 with this over-centre action serving to provide for a stable latched condition and substantially preventing accidental release of the clamp arm 34.

As a further safeguard against accidental release of the latch 48 and clamp arm 34, a locking pin 62 is provided which extends through the bifurcated portion 46 of the clamp arm 34 and also through the latch 48 when these components are in the locked position illustrated in FIGS. 1 and 6. A suitable retaining clip 64 keeps the locking pin 62 in position until such time as the retaining clip 64 is manually released. It should be emphasized here however that the over-centre action provided by the latch 48 as described above serves to provide a stable latched condition for the clamp arm 34 and that the locking pin 62 merely provides additional security against unwanted release.

In order to release the clamp arm 34 and the tarpaulin side edge 14, the user manually applies a moderate degree of force to the lower leg of the latch 48 thereby to pivot same in the clockwise direction as shown thereby to free the upper leg 54 from the inner wall of the bracket and to move the latch into the position shown in phantom in FIG. 6. This frees the clamp arm 34 for rotation in the counterclockwise direction thus freeing the side edge 14 of the tarpaulin 12, including the V-shaped rod 22 such that the user can readily remove the tarpaulin 12 and shift it across the open top of the box, with the tarpaulin being rolled up on the opposite side of the truck box or otherwise stored in any desired fashion. To reattach the tarpaulin side edge, the tarpaulin 12 is moved across the top of the box 10 until the elongated upper portion 60 of the clamp arm 34 contacts the tarpaulin side edge. This upper portion 60 acts as a stop for the tarpaulin edge and also guides the tarpaulin side edge 14 into the notched portions 38, 40 in the bracket 26 and clamp arm 34 for retention therein. Following this, the clamp arm 34 is moved to the closed position, latch 48 is moved to the latched position, and the locking pin 62 is installed.

Figure 4:
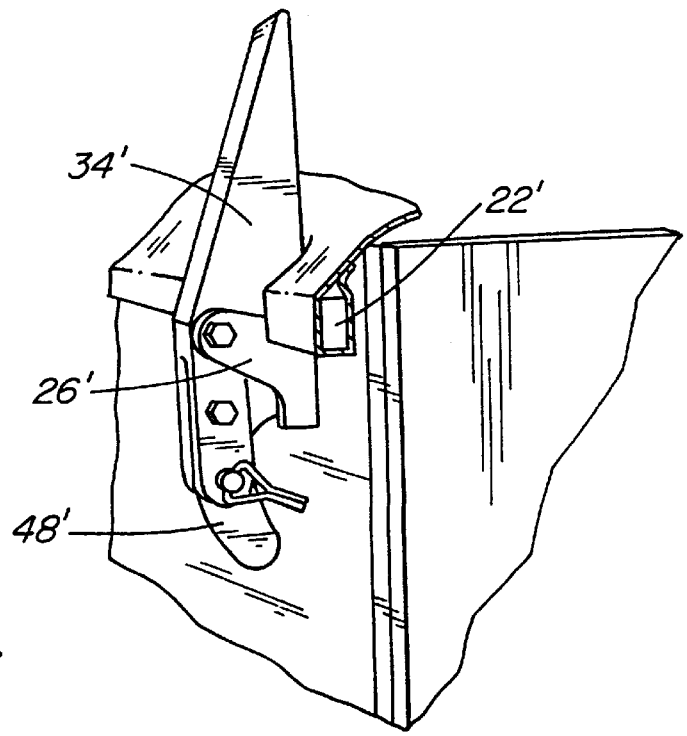
FIG. 4 is a perspective view similar to that of FIG. 2 but with a somewhat modified form of tarpaulin side edge arrangement.
Figure 5:
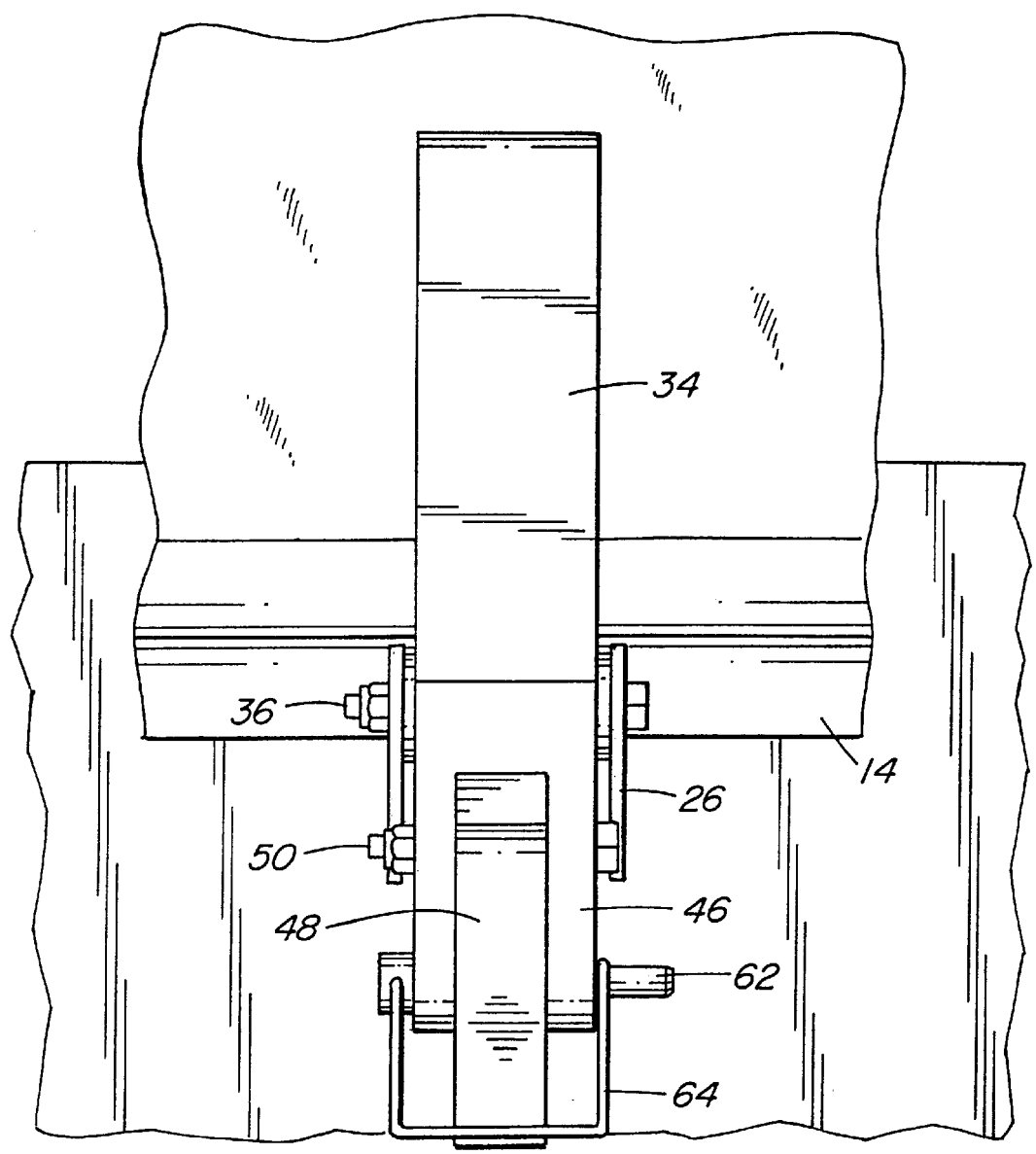
FIG. 5 is a side elevation view of the tarpaulin retention apparatus illustrated in FIGS. 1–3.

Reference will now be had briefly to the embodiment of the invention illustrated in FIG. 4. This embodiment is essentially the same in construction as the embodiment described above except that the rigid rod 22' is of rectangular cross-section instead of being V-shaped in section as in the first embodiment. Hence it will be appreciated that the clamp arm 34' is notched so as to receive therein this rectangular section as also are the ears of the bracket 26'. This embodiment is capable of functioning well in terms of its ability to retain the side edge of the tarpaulin in the closed position illustrated in FIG. 4, the only disadvantage being that the rectangular section rod 22' does not provide the additional seal for assisting in preventing air ingress under the tarpaulin as was described above in conjunction with the first embodiment. Hence, the previously described embodiment with the V-shaped rigid rod 22 is preferred over the rectangular rod illustrated in FIG. 4.

A preferred embodiment of the invention has been described and illustrated by way of example. Those skilled in the art will realize that various modifications and changes may be made while still remaining within the spirit and scope of the invention. Hence the invention is not to be limited to the embodiment as described but, rather, the invention encompasses the full range of equivalencies as defined by the appended claims.

We claim:

1. Apparatus for retaining a side edge of a tarpaulin along a side portion of an open-topped box such as a truck box, wherein said tarpaulin includes a rigid rod connected along its side edge, said apparatus comprising: a bracket for attachment to the side of the box, a clamp arm pivotally mounted to said bracket for movement about a pivot axis between a closed clamping position for securing, in use, said rod and tarpaulin side edge in fixed relation to said clamp arm and side portion of the box and an open position for releasing said rod and tarpaulin side edge, and a clamp arm latch pivotally mounted so that it can be manually shifted between a latched position wherein said clamp arm is secured in the closed position and an unlatched position wherein said clamp arm is free to pivot to the open position, and wherein said clamp arm has a recess therein shaped to receive said rigid rod and tarpaulin side edge and to secure the latter between said clamp arm and the side portion of the box.

2. Apparatus according to claim 1 wherein said clamp arm latch is pivotally connected to said clamp arm for motion about an axis spaced from the pivot axis of said clamp arm between the latched position wherein said latch is interposed between said bracket and said clamp arm to prevent pivoting of said clamp arm toward the open position and the unlatched position wherein said latch is displaced away from said bracket to permit the pivoting of said clamp arm to the open position.

3. Apparatus according to claim 2 wherein said latch is arranged to provide an over-centre action as it is manually shifted into or out of the latched position thereby to provide for a stable latched condition.

4. Apparatus according to claim 1 wherein said clamp arm and recess therein are arranged to press said rigid rod and tarpaulin side edge toward the side portion of the box to reduce air leakage therebetween when in use.

5. Apparatus according to claim 4 wherein said bracket also has a recess therein adapted to co-operate with said clamp arm recess to receive a V-shaped-in-cross section rigid rod such that a pair of legs defined by the V-shaped rod are directed toward said side portion of the box when in use and to bring one of the legs of the V-shaped rod into close proximity to said side portion to assist in sealing the tarpaulin side edge to the side portion of the box.

6. In combination, an open-topped truck or trailer box, a plurality of devices for retaining a side edge of a tarpaulin along a top side portion of said box, said side edge retaining devices being disposed in spaced apart relation along the top side portion of the box, and a tarpaulin for covering said box including a rigid rod connected along the tarpaulin side edge, each of said side edge retaining devices including a bracket attached to the top side portion of the box, a clamp arm pivotally mounted to said bracket for movement about a pivot axis between a closed clamping position for securing said rod and tarpaulin side edge in fixed relation to said clamp arm and top side portion of the box and an open position for releasing said rod and tarpaulin side edge, and a clamp arm latch pivotally mounted so that it can be manually shifted between a latched position wherein said clamp arm is secured in the closed position and an unlatched position wherein said clamp arm is free to pivot to the open position, and wherein said clamp arm has recess therein shaped to receive said rigid rod and tarpaulin side edge and to secure the latter between said clamp arm and the top side portion of the box.

7. The combination according to claim 6 wherein said clamp arm latch is pivotally connected to said clamp arm for motion about an axis spaced from the pivot axis of said clamp arm between the latched position wherein said latch is interposed between said bracket and said clamp arm to prevent pivoting of said clamp arm toward the open position and the unlatched position wherein said latch is displaced away from said bracket to permit the pivoting of said clamp arm to the open position.

8. The combination according to claim 7 wherein said latch is arranged to provide an over-centre action as it is manually shifted into or out of the latched position thereby to provide for a stable latched condition.

9. The combination according to claim 6 wherein said clamp arm and said recess therein are arranged to press said rigid rod and tarpaulin side edge toward the top side portion of the box to reduce air leakage therebetween when said clamp arm is in the closed clamping position.

10. The combination according to claim 9 wherein said bracket has a recess therein adapted to co-operate with said clamp arm recess to receive said rigid rod which is V-shaped-in-cross section and such that a pair of legs defined by the V-shaped rod are directed toward said top side portion of the box when in use and to bring one of the legs of the V-shaped rod into close proximity to said side portion to assist in sealing the tarpaulin side edge to the top side portion of the box.

\* \* \* \* \*